US008035285B2

United States Patent
Zhao et al.

(10) Patent No.: US 8,035,285 B2
(45) Date of Patent: Oct. 11, 2011

(54) HYBRID INTERFERENCE COATINGS, LAMPS, AND METHODS

(75) Inventors: Zhibo Zhao, Novi, MI (US); Tianji Zhao, Mayfield Heights, OH (US); Rajasingh Schwartz Israel, Westlake, OH (US); Jiawei Li, Richard Heights, OH (US)

(73) Assignee: General Electric Company, Schenectady, NY (US)

( * ) Notice: Subject to any disclaimer, the term of this patent is extended or adjusted under 35 U.S.C. 154(b) by 108 days.

(21) Appl. No.: 12/499,394

(22) Filed: Jul. 8, 2009

(65) Prior Publication Data

US 2011/0006659 A1 Jan. 13, 2011

(51) Int. Cl.
 *G02B 1/10* (2006.01)
 *G02B 5/28* (2006.01)

(52) U.S. Cl. ........ 313/110; 313/112; 359/586; 359/588; 359/589

(58) Field of Classification Search .......... 313/110–114, 313/489; 359/586, 588, 589
See application file for complete search history.

(56) References Cited

U.S. PATENT DOCUMENTS

| | | | |
|---|---|---|---|
| 4,940,636 A | 7/1990 | Brock et al. | |
| 4,949,005 A | 8/1990 | Parham et al. | |
| 5,138,219 A | 8/1992 | Krisl et al. | |
| 5,143,445 A | 9/1992 | Bateman et al. | |
| 5,412,274 A | 5/1995 | Parham | |
| 5,422,534 A | 6/1995 | Dynys et al. | |
| 5,569,970 A | 10/1996 | Dynys et al. | |
| 5,676,579 A | 10/1997 | Parham et al. | |
| 5,843,518 A | 12/1998 | Li et al. | |
| 6,049,169 A | 4/2000 | Gibson et al. | |
| 6,239,550 B1 * | 5/2001 | Maeda | 313/579 |
| 6,295,164 B1 | 9/2001 | Murakami et al. | |
| 6,441,541 B1 | 8/2002 | Tschetter | |
| 6,476,556 B2 | 11/2002 | Cottaar et al. | |
| 6,494,997 B1 | 12/2002 | Israel et al. | |
| 6,570,302 B1 | 5/2003 | Boonekamp et al. | |
| 6,710,520 B1 | 3/2004 | Brown et al. | |
| 6,911,125 B2 | 6/2005 | Hashimoto et al. | |
| 2004/0206306 A1 | 10/2004 | Lin | |
| 2006/0226777 A1 | 10/2006 | Cunningham | |
| 2006/0246321 A1 | 11/2006 | Molle et al. | |
| 2006/0255739 A1 | 11/2006 | Ritz et al. | |

(Continued)

FOREIGN PATENT DOCUMENTS

JP 2003149407 A * 5/2003

(Continued)

OTHER PUBLICATIONS

PCT Search Report issued in connection with corresponding WO Patent Application No. US10/039397 filed on Jun. 22, 2010.

(Continued)

*Primary Examiner* — Mariceli Santiago
(74) *Attorney, Agent, or Firm* — GE Global Patent Operation; Peter T. DiMauro (57) ABSTRACT

Disclosed herein are optical interference multilayer coatings having region provided by a physical vapor deposition process and region provided by a chemical vapor deposition process. Also disclosed herein are methods of making such coatings, as well as lamps comprising a light-transmissive envelope, at least a portion of the surface of the light-transmissive envelope being provided with the optical interference multilayer coating noted above. Such coatings, when used on lamps, may advantageously offer improved energy efficiencies for such lamps.

21 Claims, 3 Drawing Sheets

U.S. PATENT DOCUMENTS

2006/0280950 A1  12/2006  Ritz et al.

FOREIGN PATENT DOCUMENTS

| | | | | |
|---|---|---|---|---|
| JP | 2005242052 | A | * | 9/2005 |
| JP | 2006226733 | A | * | 8/2006 |
| WO | 92/05009 | A1 | | 4/1992 |
| WO | 96/06453 | A1 | | 2/1996 |
| WO | 03/048406 | A2 | | 6/2003 |
| WO | 2005/046983 | A1 | | 5/2005 |
| WO | 2006/027724 | A1 | | 3/2006 |
| WO | 2007/010462 | A2 | | 1/2007 |
| WO | 2008018871 | A1 | | 2/2008 |
| WO | 2008/078241 | A1 | | 7/2008 |
| WO | 2009/017891 | A1 | | 2/2009 |

OTHER PUBLICATIONS

Gesheva, et al. "Optical Coatings of CVD-Transition Metal Oxides as Functional Layers in 'Smart Windows' and X-Ray Mirrors". Journal of Optoelectronics and Advanced Materials vol. 7, No. 3, Jun. 2005, p. 1243-1252.

C.J. Tavares et al. "Study of roughness in Ti0.4AI0.6N/Mo multilayer structures". Nuclear Instruments and Methods in Physics Research Section B: Beam Interactions with Materials and Atoms. vol. 188, Issues 1-4, Apr. 2002, pp. 90-95.

Hunsche B., et al. "Investigation of TiO2 based thin films deposited by reactive magnetron sputtering for use at high temperatures" Thin Solid Films (2006) vol. 502, No. 1-2 pp. 188-192.

* cited by examiner

HYBRID INTERFERENCE COATINGS, LAMPS, AND METHODS

FIELD OF THE INVENTION

The present invention generally relates to optical multilayer coatings. In particular, some embodiments herein relate to optical multilayer coatings having region provided by a physical vapor deposition process and region provided by a chemical vapor deposition process.

BACKGROUND

Optical interference coatings, sometimes also referred to as thin film optical coatings or filters, comprise alternating layers of two or more materials of different indices of refraction. Some such coatings or films have been used to selectively reflect or transmit light radiation from various portions of the electromagnetic radiation spectrum, such as ultraviolet, visible and infrared radiation. For instance, optical interference coatings are commonly used in the lamp industry to coat reflectors and lamp envelopes. One application in which optical interference coatings are useful is to improve the illumination efficiency, or efficacy, of lamps by reflecting infrared energy emitted by a filament, or arc, toward the filament or arc while transmitting visible light of the electromagnetic spectrum emitted by the light source. This decreases the amount of electrical energy necessary for the light source to maintain its operating temperature.

Optical interference coatings generally comprises two different types of alternating layers, one having a low refractive index and the other having a high refractive index. With these two materials having different indices of refraction, an optical interference coating, which can be deposited on the surface of the lamp envelope, can be designed. In some cases, the coating or filter transmits the light in the visible spectrum region (generally from about 380 to about 780 nm wavelength) emitted from the light source while it reflects the infrared light (generally from about 780 to about 2500 nm). The returned infrared light heats the light source during lamp operation and, as a result, the lumen output of a coated lamp is considerably greater than the lumen output of an uncoated lamp.

With the advent of potential energy regulations for incandescent and halogen lamps, it has become increasingly important to develop and introduce energy efficient products. In view of this, improved optical interference multilayer coatings and methods for their production have been developed, which have shown enhanced gain or energy efficiency. In some previous work, a low-pressure chemical vapor deposition (CVD) process has been employed to prepare optical interference coatings for lamps (for example, see commonly owned U.S. Pat. No. 5,412,274). In some other previous work, physical vapor deposition (PVD) processes have advantageously been employed, e.g. magnetron sputtering processes.

There remains a need for new and improved methods to develop and introduce energy efficient products.

BRIEF SUMMARY OF THE INVENTION

One embodiment of the present invention is directed to an article comprising an optical interference multilayer coating, the coating having a first region formed by a physical vapor deposition process and a second region formed by a chemical vapor deposition process. The first region comprises a first plurality of alternating first and second layers, the first layers having relatively low refractive index and the second layers having relatively higher refractive index than the first layers; and the second region comprises a second plurality of alternating third and fourth layers, the third layers having relatively low refractive index and the fourth layers having relatively higher refractive index than the third layers.

A further embodiment of the present invention is directed to a lamp comprising a light-transmissive envelope having a surface and a light source, the envelope at least partially enclosing the light source. At least a portion of the surface of the light-transmissive envelope is provided with an optical interference multilayer coating, the coating having a first region formed by a physical vapor deposition process and a second region formed by a chemical vapor deposition process. The first region comprises a first plurality of alternating first and second layers, the first layers having relatively low refractive index and the second layers having relatively higher refractive index than the first layers; and the second region comprises a second plurality of alternating third and fourth layers, the third layers having relatively low refractive index and the fourth layers having relatively higher refractive index than the third layers.

Other features and advantages of this invention will be better appreciated from the following detailed description.

BRIEF DESCRIPTION OF THE DRAWINGS

Embodiments of the invention will now be described in greater detail with reference to the accompanying Figures.

DETAILED DESCRIPTION

In accordance with embodiments, new types of coatings and methods of making are disclosed herein, which can have increased effectiveness for forming relatively thick (e.g., greater than 10 micron) optical interference coatings. These methods typically may utilize both CVD process and PVD process. In accordance with embodiments of this disclosure, the favorable aspects of each coating process may be employed, with minimization of the problematic aspects of each process.

As noted, an embodiment of the invention is directed to an article comprising an optical interference multilayer coating, the coating having a first region formed by a physical vapor deposition process and a second region formed by a chemical vapor deposition process. The first region comprises a first plurality of alternating first and second layers, the first layers having relatively low refractive index and the second layers having relatively higher refractive index than the first layers; and the second region comprises a second plurality of alternating third and fourth layers, the third layers having relatively low refractive index and the fourth layers having relatively higher refractive index than the third layers. Typically, the alternating first and second layers in the first plurality of layers may be spectrally adjacent to at least each other, and may also be physically adjacent to each other. Furthermore, it is typical for the alternating third and fourth layers in the second plurality of layers to be spectrally adjacent to at least each other; these may also be physically adjacent to each other.

In general, the first layers and third layers may be referred to the "low index" layers, and may have a refractive index of from about 1.35 to about 1.7 at 550 nm. Typically, these low index layers may include a material independently selected from ceramic materials, refractory materials, silicon, oxides of metals or metalloids, and nitrides of metals or metalloids; fluorides of metals or metalloids; or the like. Fluorides of metals may include compounds such as $MgF_2$. Often, these low index layers may include a silicon oxide, such as glass or quartz or other form of amorphous or crystalline silica. The most commonly employed low index material is one or more form of $SiO_2$, due to its low refractive indices, low cost, and favorable thermal property. The first layer material can be the same as the third layer material, or the first layer material can be different from the third layer material.

In general, the second layers and said fourth layers may be referred to a the "high index" materials, and may have a refractive index of from about 1.7 to about 2.8 at 550 nm. Typically, such high index materials may comprise any material having a refractive index relatively higher than that of the first and third layers. Many refractory materials are suitable for high index materials. Often, such high index materials may be independently selected from one or more oxides (or mixed oxides) of one or more metal selected from the group consisting of Ti, Zr, Hf, Nb, W, Mo, In, and Ta; or the like. The second layer material can be the same as the fourth layer material, or the second layer material can be different from the fourth layer material. The composition of the second and fourth layers may include (for example): (1) physical mixtures of two or more of such metal oxides; or (2) may include physical mixtures of a mixed metal oxide and another metal oxide; or (3) may include a mixed metal oxide of at least two metals in the group; among other possibilities. Specific possible examples may include NbTaX oxide where X is selected from the group consisting of Hf, Al and Zr; or NbTiY oxide where Y is selected from the group consisting of Ta, Hf, Al and Zr; or TiAlZ oxide where Z is selected from the group consisting of Ta, Hf and Zr. In general, then, the second and fourth layers may comprise any material heretofore typically employed as a high refractive index material in optical interference multilayer coatings, as well as other high refractive index materials.

In accordance with embodiments of the invention, the first region is formed by a physical vapor deposition process (PVD), and the second region is formed by a chemical vapor deposition process (CVD). Other regions may also be present in the coating, formed via either of these methods or other methods. In general, PVD processes employed may be selected from the group consisting of: thermal evaporation; RF evaporation; electron beam evaporation; reactive evaporation; DC sputtering; RF sputtering; microwave sputtering; magnetron sputtering; microwave-enhanced DC magnetron sputtering; arc plasma deposition; reactive sputtering; laser ablation; and combinations thereof, or the like. Typically, CVD process employed may be selected from the group consisting of: atmospheric pressure CVD; low-pressure CVD; high-vacuum CVD; ultrahigh-vacuum CVD; aerosol-assisted CVD; direct liquid-injection CVD; microwave plasma-assisted CVD; plasma-enhanced CVD; remote plasma-enhanced CVD; atomic layer CVD; hot wire CVD; metal-organic CVD; hybrid physical-chemical vapor deposition; rapid thermal CVD; vapor phase epitaxy; and combinations thereof, or the like.

As is generally understood, in a typical chemical vapor deposition process, a substrate is exposed to one or more volatile or gas-like precursors (usually molecular precursors), which precursors react and/or decompose on the substrate surface to produce the desired deposit. There are a variety of different types of CVD processes, which may be classified by the features of their operating pressure, characteristics of the vapor, types of energy input, or other features. All of the following are to be included within the scope of "CVD" processes, as that term is used herein. For instance, some CVD processes include: atmospheric pressure CVD; low-pressure CVD (LPCVD) (wherein chemical vapor deposition typically occurs at sub-atmospheric pressures); and high- or ultrahigh-vacuum CVD, which is usually conducted at below about $10^{-6}$ Pa. In other forms of CVD, the precursor is not strictly in the gaseous state: aerosol-assisted CVD employs precursors as a liquid-gas aerosol, while direct liquid-injection CVD (DLICVD) uses liqueform precursors which are injected and transported to a substrate.

Some CVD methods are assisted by energetic means, such as microwave plasma-assisted CVD (MPCVD), plasma-enhanced (or plasma-assisted) CVD (PECVD), and remote plasma-enhanced CVD (RPECVD). Other types of CVD may include atomic layer CVD (ALCVD), hot wire CVD (HWCVD), metal-organic CVD (MOCVD); hybrid physical-chemical vapor deposition (HPCVD), rapid thermal CVD (RTCVD), vapor phase epitaxy (VPE); and the like. These respective types of CVD are not always intended to be mutually exclusive; therefore, combinations employing more than one of the foregoing CVD processes are also contemplated. For example, any person skilled in the field would clearly understand that plasma-assisted CVD may be inclusive of remote plasma-enhanced CVD. Similarly, a hot wire CVD process employing organometallic precursors can also be considered an MOCVD process, as would be readily understood by those skilled in the art.

Where LPCVD is used to deposit multilayer coatings, it may typically employ the process as set forth in U.S. Pat. No. 5,143,445. Additionally, any of the conditions and precursors shown in commonly owned U.S. Pat. No. 5,412,274 may be suitable for use in the present disclosure. Additionally exemplary chemical vapor deposition and low-pressure chemical vapor deposition processes, are described, for example, in U.S. Pat. Nos. 4,949,005, 5,143,445, 5,569,970, 6,441,541, and 6,710,520. All of these noted patents are hereby incorporated by reference in pertinent part.

As would be generally understood by persons skilled in the art, in a typical physical vapor deposition (PVD) process, a material is vaporized by a physical process and thereafter condensed at a substrate to form a deposit. Sometimes, the vaporized material can undergo a reaction such as oxidation (by reaction with oxygen). Often, a deposit is made on a substrate by the steps of converting the material to be deposited into vapor by a physical means, transporting the vapor from its source to the substrate, and condensing the vapor on the substrate. Generally, in PVD processes, the vaporized material (usually in atomic form, such as metal atoms) does not itself have to undergo decomposition in order to be deposited. This is the typical distinguishing factor from CVD, where a precursor (usually molecular) must decompose or react before forming a deposit. PVD processes are often characterized by the type of energetic input needed to form the vapor. As used herein, PVD processes may include thermal evaporation, RF evaporation, electron beam evaporation, reactive evaporation, DC sputtering, RF sputtering, microwave sputtering, magnetron sputtering, microwave-enhanced DC magnetron sputtering, arc plasma deposition, reactive sputtering, laser ablation; and the like.

These respective types of PVD are not always intended to be mutually exclusive; therefore, combinations employing more than one of the foregoing PVD processes are also contemplated. For example, it would be understood that "magnetron sputtering" may be inclusive of both DC and RF magnetron sputtering. Similarly, it would be understood that "DC magnetron sputtering" may be inclusive of "microwave-enhanced DC magnetron sputtering". However, regardless of whether alternative methods with overlapping scope is recited, any person skilled in the field would clearly understand the nature of the method.

Where RF magnetron sputtering is used to deposit multilayer coatings, one may suitably employ processes shown in U.S. Pat. No. 6,494,997, hereby incorporated by reference in pertinent part. Magnetron sputtering is where a high-energy inert gas plasma is used to bombard a target. The sputtered atoms condense on the cold glass or quartz housing. DC (direct current), pulsed DC (40-400 KHz), or RF (radio frequency, 13.65 MHz) processes may be used.

In accordance with embodiments, the article having the first and second regions as described above, may further comprise at least one supplemental multilayer region comprising alternating relatively lower refractive index layers and relatively higher refractive index layers. When such supplemental region (if present) is physically adjacent to the first region, such supplemental region may be deposited by CVD. When such supplemental region (if present) is physically adjacent the second region, such supplemental region may be deposited by PVD.

In accordance with embodiments, the article may further comprise at least one substrate. In some embodiments, the first region is closer to the at least one substrate than the second region. In some other embodiments, the second region is closer to the at least one substrate than the first region.

Figure 1:
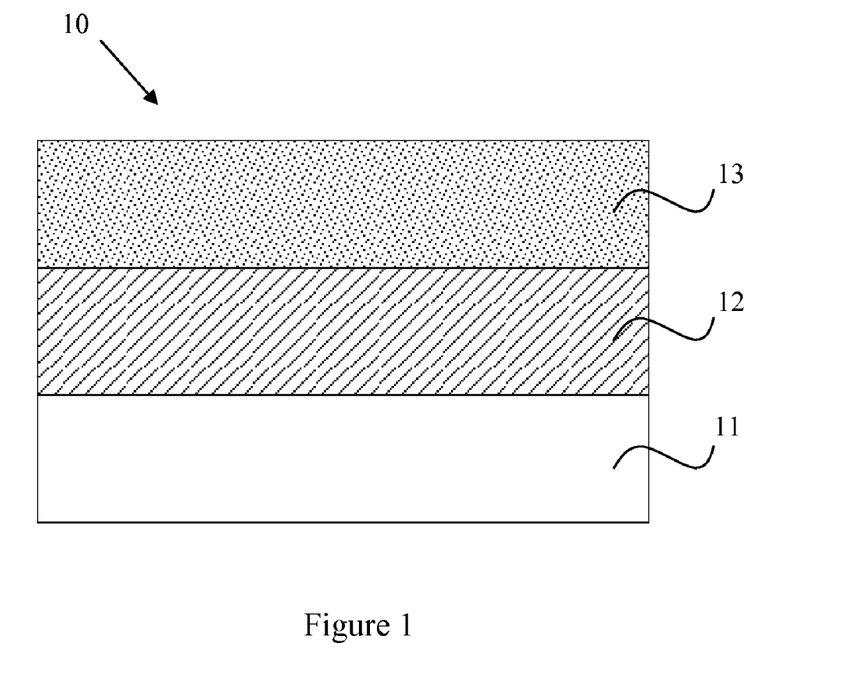
FIG. 1 is a schematic illustration of an article having a bottom PVD region and a top CVD region, in accordance with embodiments of the invention.
Figure 2:
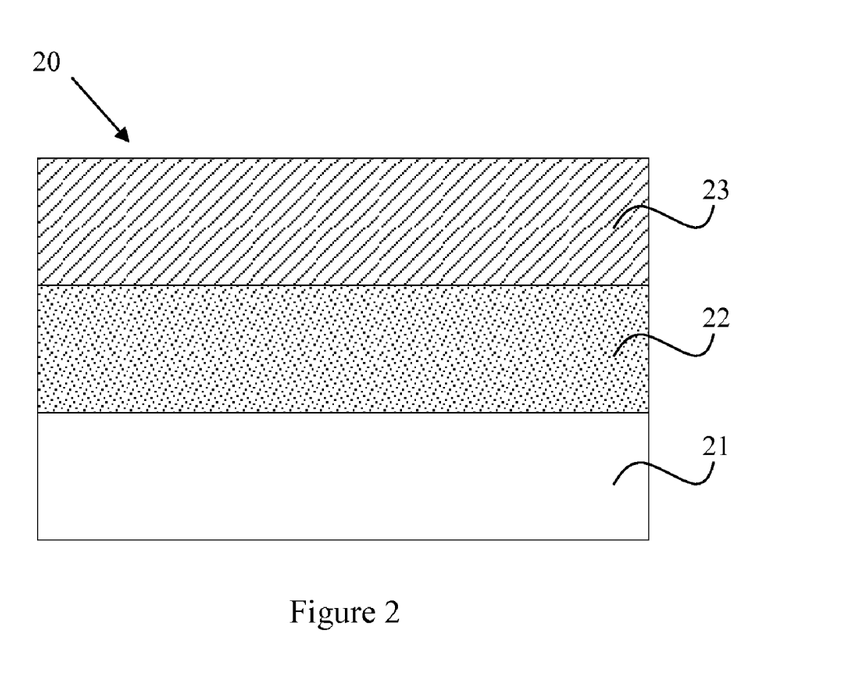
FIG. 2 is a schematic illustration of an article having a bottom CVD region and a top PVD region, in accordance with embodiments of the invention.
Figure 3:
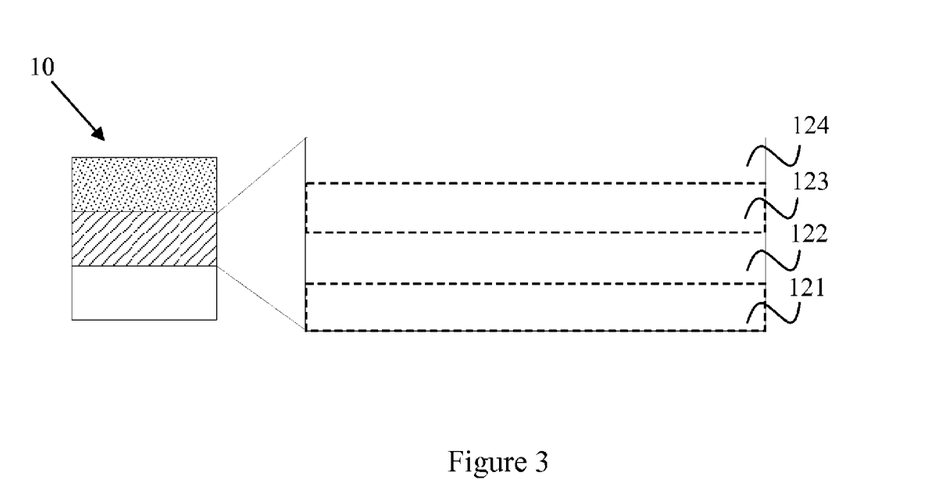
FIG. 3 is a schematic depiction of bottom multilayers of the article of FIG. 1, in accordance with embodiments of the invention.
Figure 4:
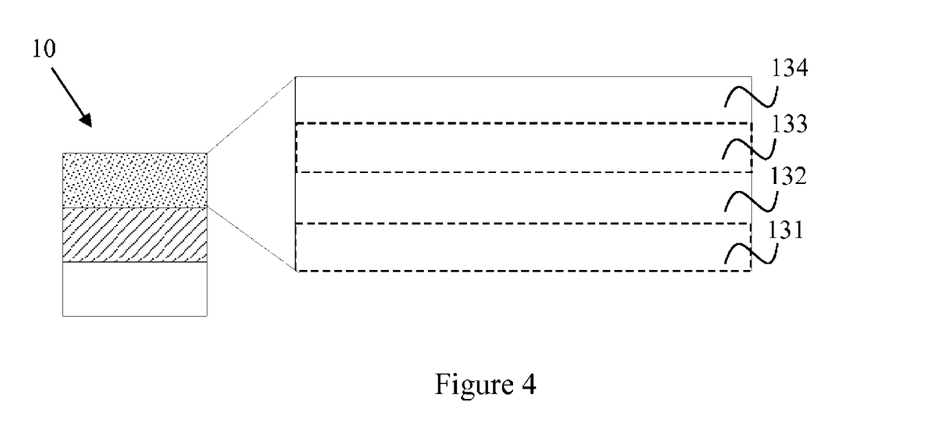
FIG. 4 is a schematic depiction of top multilayers of the article of FIG. 1, in accordance with embodiments of the invention.

Schematic illustrations of embodiments are shown in FIGS. 1 through 4. In FIG. 1 is depicted article 10 comprising a substrate 11, first region 12 deposited by PVD, and second region 13 deposited by CVD. Regions are depicted as physically adjacent in this illustration, but the invention is not limited to the manner depicted in these figures. In FIG. 2 is depicted an alternatively arranged article 20 having substrate 21, a second (i.e., CVD) region 22 as a bottom layer, and a first (i.e., PVD) region 23 as a top layer. FIGS. 3 and 4 illustrate greater detail for regions of article 10. In FIG. 3, the first region is composed of alternating layers 121, 122, 123, 124 having low and high refractive indices, respectively. In FIG. 4, the second region of article 10 is shown having alternating layers 131, 132, 133, 134 having low and high refractive indices, respectively. Although only four layers per region are shown, the invention is not limited to these embodiments.

In some embodiments of the present invention, the article comprises a first region having a first average interface roughness among the first plurality of alternating first and second layers; and the article comprises a second region having a second average interface roughness among the second plurality of alternating third and fourth layers; wherein the first average interface roughness is greater than the second average interface roughness. Generally, any two adjacent layers in a region (for example, first and second layers) do not have a perfectly atomically smooth interface between them. There is typically some kind of interface roughness between layers, which can be detected. Interface roughness can be measured by any method known to a person skilled in the field, including such methods as TEM, HRTEM, STM, SEM, and the like.

"Interface roughness", sometimes also referred to as "interfacial roughness", is generally measured in units of length such as nm or Angstroms. As used herein, the term "interface roughness" is generally a root-mean-square (rms) roughness for a given interface.

As noted above, a first region may sometimes be characterized by a "first average interface roughness", which is the typically the mean of the rms interface roughness taken over all (or substantially all) the layers of the first portion. Generally, the interface roughness between substantially all the layers in the first region is quantified and averaged. Likewise, a "second average interface roughness" is the typically the mean of the rms interface roughness taken over all (or substantially all) the layers of the second portion. In the case of a hybrid coating having a first portion deposited by a PVD method, and having a second portion deposited by a CVD method, each respective portion may have a different average interface roughness. In typical embodiments, the first average interface roughness is at least about 10% greater than the second average interface roughness. In other embodiments, the first average interface roughness is at least about 20% greater (e.g., at least about 50% greater) than the second average interface roughness. In certain embodiments, the first average interface roughness may be greater than about 10 nm, more particularly greater than about 20 nm. In certain embodiments, the second average interface roughness may be less than about 10 nm, more particularly less than about 5 nm.

In some embodiments of the invention, the first and/or second layers of the first region may be characterized by comprising metal oxide grains having a substantially columnar or acicular structure. In still other embodiments, the first and/or second layers of the first region may be further characterized by comprising metal oxide grains wherein voids are present between at least some of these grains. Either or both of these can sometimes be a characteristic feature of metal oxides deposited by a PVD method. However, under certain conditions, especially when deposited at temperatures exceeding about 500° C., the first region may instead sometimes be substantially amorphous.

In accordance with some embodiments is provided an article comprising an optical interference multilayer coating, wherein the coating has a total geometrical thickness of from about 0.2 to about 30 microns, or even sometimes even higher. By "total geometrical thickness" of the coating is included the first and the second regions, but not the substrate. In other embodiments, the total geometrical thickness of the coating may be greater than around 10 microns. Other ranges for total geometrical thickness may include from about 2 to about 22 microns, or from about 8 to about 15 microns. The endpoints of these ranges are independently combinable to form new ranges, such as from about 2 to about 15 microns. A relatively thicker total coating can lead to higher efficiency for applications where the optical interference multilayer coating is configured to act as a bandpass filter which reflects infrared radiation and transmits visible radiation.

Typically, the first region may comprise a geometrical thickness of from about 2% to about 98% of the total geometrical thickness of the coating. In some embodiments, the first region comprises a geometrical thickness of from about 50% to about 90% of the total geometrical thickness of the coating, and the second region comprises a geometrical thickness of from about 10% to about 50% of the total geometrical thickness of the coating. In some configurations, the first region may include a geometrical thickness of from about 0.1 to about 20 microns (e.g., greater than about 4 microns), or more narrowly, from about 1 to about 15 microns. In some configurations, the second region may include a geometrical thickness of from about 0.1 to about 10 microns, or more narrowly, from about 1 to about 7 microns.

According to embodiments of the invention, the coating may independently have a total number of layers in each region of from 4 to 250. All integral values there between are specifically contemplated. The total number of layers in a region is not particularly critical. Stated more narrowly, the total number of layers in a region may range from any integer from 30 to 150 layers. In some cases, the region deposited by CVD may have 46 layers, while the region deposited by PVD may have 60 layers. In some embodiments of this disclosure, each of said first, second, third, and fourth layers individually have an average thickness of from about 20 nm to about 500 nm, or sometimes from about 10 nm to about 200 nm.

In accordance with certain embodiments, the optical interference multilayer coating is configured to act as a "hot mirror", i.e., a coating which substantially transmits light in the visible spectrum region (generally from about 380 to about 780 nm wavelength) emitted from a light source while it substantially reflects infrared light (generally from about 780 to about 2500 nm). In such embodiments, the optical interference multilayer coating may have an average transmittance in visible light of greater than about 60% (more preferably, greater than about 80%) and have an average reflectance of at least about 30% (and more usually, greater than about 70%) in the infrared region of the electromagnetic spectrum.

According to embodiments of this disclosure is provided a method for making an article having an optical interference multilayer coating as described above. Such method comprises providing a substrate; and depositing a first region and a second region, in any order. The first region is deposited by a physical vapor deposition to form a plurality of alternating first and second layers, the first layers having relatively low refractive index and said second layers having relatively higher refractive index than the first layers. The second region is deposited by a chemical vapor deposition process to form a plurality of alternating third and fourth layers, the third layers having relatively low refractive index and the fourth layers having relatively higher refractive index than the third layers. Either one of the first and second region is adjacent to the substrate. The method may also comprise one or supplemental region intermediate to the first and second regions, or one or more supplemental region between the substrate and the first or second region. After deposition of the first and the second regions, one may generally employ an annealing step, conducted at a temperature such as from about 300° C. to about 500° C. (e.g., about 400° C.) for a time period such as of from about 12 h to about 60 h (e.g., about 48 h). In some embodiments, the substrate may comprise a lamp envelope. Such lamp envelope may be made of any transparent or translucent material, such as quartz or glass or the like. The shape of the substrate is not particularly limited, but may include shapes such as cylindrical or elliptical or the like, for example.

Coatings according to embodiments of the invention, usually employed upon substrates in articles, can be utilized for any of a wide variety of applications where optical interference coatings are desired or typically used. These include, for example, lighting applications (e.g., lamps), optical waveguides, reflectors, decorative materials, security printing; or the like. In some embodiments the coatings are used to selectively reflect one portion of the electromagnetic spectrum while transmitting another portion of the electromagnetic spectrum. For instance, the coatings can be used as a "cold mirror" or a "hot mirror". A "cold mirror" is an optical filter that reflects visible light while at the same time permitting longer wavelength infrared energy to pass through the filter. A "hot mirror" is an optical filter that reflects infrared radiation while at the same time permitting shorter wavelength visible light to pass through the filter. One nonlimiting application of hot mirrors herein is to return infrared heat to the filament of a lamp in order to increase lamp efficiency.

In accordance with embodiments of the invention, there are also provided a lamp or lamps including the optical interference multilayer coatings of the present disclosure. Such lamps generally comprise a light-transmissive envelope having a surface, and a light source, with the envelope at least partially enclosing the light source. At least a portion of the surface of the light-transmissive envelope is provided with the optical interference multilayer coating. As is generally known, such light-transmissive envelopes may be composed of any material which is light transmissive to an appreciable extent and is capable of withstanding relatively hot temperature (e.g., about 800° C. or even above); for example, it may be composed of quartz, ceramic, or glass; or the like. The light source may be an incandescent source (for example, one which provides light through resistive heating of a filament); and/or it may be an electric arc discharge source, such as a high-intensity discharge (HID) source; and/or it may be another type of light source.

Usually, where a filament is employed, it is composed of a refractory metal, generally in coiled form, such as tungsten or the like, as is well known. To energize the lamp, there is typically provided at least one electric element arranged in the envelope and connected to current supply conductors (or electrical leads) extending through the envelope. Usually, the envelope encloses a fill gas. A preferable fill gas includes any gas or gaseous mixture which is selected to promote lamp life, quality, and/or performance. Some fill gases may include an ionizable fill gas, such as at least one rare gas (such as krypton or xenon), and/or a vaporizable halogen substance, such as an alkyl halide compound (e.g., methyl bromide). Halogen-containing gases may often be employed. Many other fill compositions are also contemplated, such as those which may include metal halides, mercury, and combinations thereof.

The lamp in accordance with this disclosure may have the optical interference multilayer coating on either the inner surface or the outer surface of the lamp envelope. Alternatively, the lamp may have the optical interference multilayer coating on both the inner surface and the outer surface of the lamp envelope.

Figure 5:
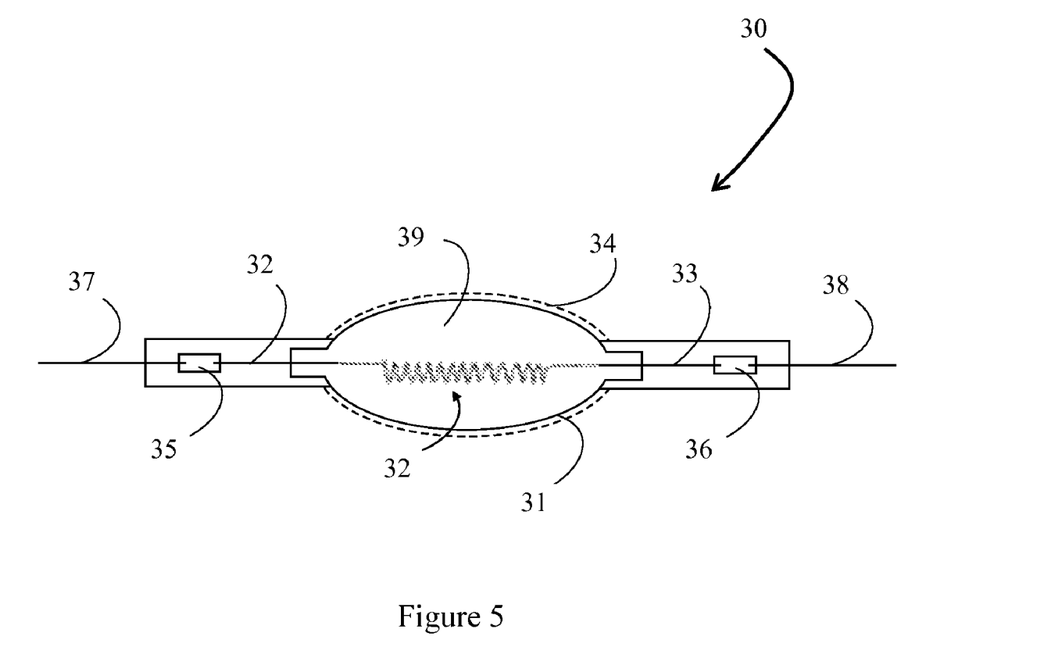
FIG. 5 is a schematic depiction of an exemplary lamp, in accordance with embodiments of the invention.

Referring now to FIG. 5, here is shown a schematic depiction of an exemplary lamp in accordance with embodiments of the invention. It is not intended to be limiting, and is not a scale drawing. In this illustrative embodiment, lamp 30 comprises a hermetically sealed, vitreous, light transmissive quartz envelope 31, the outer surface of which is coated with a multilayer optical interference coating 34. Envelope 31 encloses coiled tungsten filament 32 which can be energized by inner electrical leads 32,33. The inner electrical leads 32,33 are welded to foils 35,36, and outer electrical leads 37,38 are welded to the opposite ends of the foils. In the interior 39 of envelope 31 is disposed an ionizable fill comprising a halogen or halogen compound.

The above-described optical interference coatings, when used as coatings on lamps, may advantageously offer improved energy efficiencies for such lamp, e.g. halogen lamps. Such improvement may be manifest in an increased value for LPW (lumen per watt). When expressed as percent, the increase in LPW is referred to as "gain". Halogen lamps when coated with optical interference films, in accordance with embodiments of the present invention, may exhibit a gain of from about 20% to about 150%, more preferably greater than about 33%, and even more preferably from about 100% to about 150%, versus uncoated lamps. Such comparisons are typically performed on the same lamps energized to the same hot filament temperature, e.g., at the temperature of usual operation. Furthermore, the above-described optical interference films may also exhibit high structural and optical integrity even after exposure to temperatures up to about 800° C. or even higher. Yet furthermore, lamps coated with optical interference coatings in accordance with embodiments of the present invention, may exhibit improved consistency and performance stability, and have an improved appearance (smooth and clear coating surface).

The "hybrid" coatings of the present disclosure may overcome certain deficiencies in the use of coatings deposited by either CVD alone or PVD alone. Typically, CVD processes can be subject to limitations as to the thickness of coatings that can be deposited. Often, stresses in thick CVD coatings can be developed. Largely due to these stress development issue, the coatings are typically limited to a maximum thickness of below about 5 to 6 microns. PVD processes are generally capable of generating thicker coatings (such as, for example, about 15 to 16 microns optical interference multilayer coatings on lamps) without stress-related issues. However, it is sometimes difficult to control interfacial roughness and surface roughness when the coatings approach such thicknesses. Moreover, as a line-of-sight process, the PVD process can require relatively complicated mechanical maneuvering for application to substrates, such as lamps. Accordingly, its batch productivity is relatively low and cost is relatively high compared to CVD process.

In contrast, the present "hybrid" coating may offer desirable coating characteristics not easily attainable by a coating deposited by CVD or PVD alone. For example, it may be desirable in certain instances to employ optical interference multilayer coatings having a geometrical thickness of at least about 10 micrometers in order to achieve a high (e.g., >100%) "gain" for halogen lamps. However, applicants have found that a CVD process alone cannot produce such a thick coating due to stress related issues. Although PVD can deposit thick coatings, it is often difficult to control roughness when coatings approach high thickness. By dividing a coating (for example) into the present two regions, then the region deposited by CVD can readily achieve a smooth interface, and the remaining region can be deposited by a PVD process, with greater control of the interfacial roughness relative to having the whole coating be made by PVD. The hybrid coating may also achieve cost efficiencies relative to one made by PVD alone. Moreover, the compressive stress in the PVD coatings may cancel the tensile stress in the CVD portion, making the coating less prone to cracking and delamination. This may be especially advantageous where a CVD-deposited region is adjacent a substrate but is deposited to a thickness which would otherwise delaminate or crack in the absence of a PVD overlayer.

In order to promote a further understanding of the invention, the following examples are provided. These examples are illustrative, and should not be construed to be any sort of limitation on the scope of the claimed invention.

EXAMPLES

Example 1

Two DEQ lamps were coated on the outer envelope surface with an optical interference multilayer coating via a LPCVD process, and denoted lamps A and B, respectively. Lamp A was coated with a 46 layer stack of alternating silica and tantalum oxide, while Lamp B was coated with a 46 layer stack of alternating layers of silica and a niobium-tantalum oxide. All stacks deposited by LPCVD had a geometrical thickness of about 4 microns. Each of lamps A and B were further coated with a second optical interference multilayer stack, via sputtering. The second optical interference multilayer stack in each case was composed of 36 layers of alternating silica and Nb—Ti—Al oxide layers, in a hot mirror design. For sputter deposition of the silica layers, cathode power was set to 3 kW, argon flow was 80 sccm (standard cubic centimeters per minute), and $O_2$ pressure was $2.5\times10^{-5}$ torr (0.0033 Pa). For sputter deposition of the Nb—Ti—Al oxide layers, cathode power was set to 4 kW, argon flow was 80 sccm (standard cubic centimeters per minute), and $O_2$ pressure was $3.2\times10^{-4}$ torr (0.043 Pa). All stacks deposited by sputtering has a geometrical thickness of about 4 microns. The combined hybrid coatings on each lamp were then annealed at 400° C. for 48 h.

Example 2

The methodology of Example 1 was employed to provide a DEQ halogen lamp having a bottom coating, external to the quartz envelope, of 46 L (layers) deposited to a thickness of 4.5 microns by LPCVD of alternating silica/NbTa oxide. For the top coating, 60 L of alternating silica/NbTiAl oxide was deposited to 4.5 microns by PVD (sputtering). Surprisingly, even though the total coating was nearly 10 microns, the transmittance spectrum showed almost no haze. Furthermore, it was unexpectedly found that the PVD layer provided a protective effect on the bottom coating, whereby the CVD-provided coating was observed to not peel when the lamp is in operation, despite its thickness. Finally, the calculated LPW gain was about 10% relative to the same CVD coating without the PVD layer.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity is inclusive of the stated value and has the meaning dictated by the context (for example, includes the degree of error associated with the measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present. The singular forms "a", "an" and "the" include plural referents unless the context clearly dictates otherwise. All ranges disclosed herein are inclusive of the recited endpoint and independently combinable.

As used herein, the phrases "adapted to," "configured to," and the like refer to elements that are sized, arranged or manufactured to form a specified structure or to achieve a specified result. While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An article comprising an optical interference multilayer coating, said coating comprising,
   a first region comprising a first plurality of alternating first and second layers, said first layers having relatively low refractive index and said second layers having relatively higher refractive index than the first layers; and
   a second region comprising a second plurality of alternating third and fourth layers, said third layers having relatively low refractive index and said fourth layers having relatively higher refractive index than the third layers;
   wherein said first region is formed by a physical vapor deposition process, and said second region is formed by a chemical vapor deposition process.

2. The article of claim 1, wherein said PVD process is selected from the group consisting of: thermal evaporation; RF evaporation; electron beam evaporation; reactive evaporation; DC sputtering; RF sputtering; microwave sputtering; magnetron sputtering; microwave-enhanced DC magnetron sputtering; arc plasma deposition; reactive sputtering; laser ablation; and combinations thereof.

3. The article of claim 1, wherein said CVD process is selected from the group consisting of: atmospheric pressure CVD; low-pressure CVD; high-vacuum CVD; ultrahigh-vacuum CVD; aerosol-assisted CVD; direct liquid-injection CVD; microwave plasma-assisted CVD; plasma-enhanced CVD; remote plasma-enhanced CVD; atomic layer CVD; hot wire CVD; metal-organic CVD; hybrid physical-chemical vapor deposition; rapid thermal CVD; vapor phase epitaxy; and combinations thereof.

4. The article according to claim 1,
   wherein said first region has a first average interface roughness among said first plurality of alternating first and second layers, and said second region has a second average interface roughness among said second plurality of alternating third and fourth layers, and
   wherein said first average interface roughness is greater than said second average interface roughness.

5. The article of claim 4, wherein said first average interface roughness is at least about 10% greater than said second average interface roughness.

6. The article of claim 1, wherein said first layers and said third layers comprise a material independently selected from ceramic materials, refractory materials, oxides of metals or metalloids, fluorides of metals or metalloids, and nitrides of metals or metalloids.

7. The article of claim 1, wherein said second and said fourth layers comprise a material independently selected from one or more oxides or mixed oxides of one or more metal selected from Ti, Zr, Hf, Nb, W, Mo, In, and Ta.

8. The article according to claim 1, wherein said first region comprises a geometrical thickness of from about 50% to about 90% of the total geometrical thickness of the coating, and said second region comprises a geometrical thickness of from about 10% to about 50% of the total geometrical thickness of the coating.

9. The article according to claim 1, wherein said coating has an average transmittance in visible light of greater than 60% and has an average reflectance of at least about 30% in the infrared region of the electromagnetic spectrum.

10. A lamp comprising:
    a light-transmissive envelope having a surface; and a light source, said envelope at least partially enclosing said light source;
    wherein at least a portion of the surface of the light-transmissive envelope is provided with an optical interference multilayer coating comprising,
    (a) a first region comprising a first plurality of alternating first and second layers, said first layers having relatively low refractive index and said second layers having relatively higher refractive index than the first layers; and
    (b) a second region comprising a second plurality of alternating third and fourth layers, said third layers having relatively low refractive index and said fourth layers having relatively higher refractive index than the third layers;
    wherein said first region is formed by a chemical vapor deposition process, and said second region is formed by a physical vapor deposition process.

11. The lamp according to claim 10, wherein said optical interference multilayer coating is provided on one or both of an inner surface and an outer surface of said envelope.

12. The lamp according to claim 10, wherein said light source comprises a filament and wherein said lamp, when energized to a hot filament temperature, exhibits an LPW gain of from about 20% to about 150% as compared to the same lamp energized to the same hot filament temperature without said coating.

13. The lamp according to claim 10, further comprising at least one electric element arranged in the envelope and connected to current supply conductors extending through the envelope.

14. The lamp according to claim 10, wherein the light source comprises one or more of filament or electric arc.

15. The lamp according to claim 10, wherein the envelope encloses a fill gas selected to promote lamp life, quality, and/or performance.

16. The lamp according to claim 10,
    wherein said first region has a first average interface roughness among said first plurality of alternating first and second layers, and said second region has a second average interface roughness among said second plurality of alternating third and fourth layers, and
    wherein said first average interface roughness is greater than said second average interface roughness.

17. The lamp according to claim 10, wherein said coating has an average transmittance in visible light of greater than 60% and has an average reflectance of at least about 30% in the infrared region of the electromagnetic spectrum.

18. A method for making an article having an optical interference multilayer coating, said method comprising,
    providing a substrate,
    depositing by a physical vapor deposition process a first region comprising a first plurality of alternating first and second layers, said first layers having relatively low refractive index and said second layers having relatively higher refractive index than the first layers;
    depositing by a chemical vapor deposition process a second region comprising a second plurality of alternating third and fourth layers, said third layers having relatively low refractive index and said fourth layers having relatively higher refractive index than the third layers;
    wherein one of said first and second region is adjacent to the substrate.

19. The method of claim 18, wherein said PVD process is selected from the group consisting of: thermal evaporation; RF evaporation; electron beam evaporation; reactive evaporation; DC sputtering; RF sputtering; microwave sputtering; magnetron sputtering; microwave-enhanced DC magnetron sputtering; arc plasma deposition; reactive sputtering; laser ablation; and combinations thereof.

20. The method of claim 18, wherein said CVD process is selected from the group consisting of: atmospheric pressure CVD; low-pressure CVD; high-vacuum CVD; ultrahigh-vacuum CVD; aerosol-assisted CVD; direct liquid-injection CVD; microwave plasma-assisted CVD; plasma-enhanced CVD; remote plasma-enhanced CVD; atomic layer CVD; hot wire CVD; metal-organic CVD; hybrid physical-chemical vapor deposition; rapid thermal CVD; vapor phase epitaxy; and combinations thereof.

21. An article comprising an optical interference multilayer coating, said coating comprising,
    a first region comprising a first plurality of alternating first and second layers, said first layers having relatively low refractive index and said second layers having relatively higher refractive index than the first layers; and
    a second region comprising a second plurality of alternating third and fourth layers, said third layers having relatively low refractive index and said fourth layers having relatively higher refractive index than the third layers;
    wherein said first region is formed by a physical vapor deposition process, and said second region is formed by a chemical vapor deposition process;
    and wherein the optical interference multilayer coating is configured to act to substantially transmit light in the visible spectrum region while substantially reflecting infrared light.

\* \* \* \* \*